United States Patent
Maekawa et al.

(10) Patent No.: US 12,033,599 B2
(45) Date of Patent: Jul. 9, 2024

(54) IMAGE DISPLAY SYSTEM, IMAGE DISPLAY METHOD, IMAGE DISPLAY PROGRAM, AND IMAGE DISPLAY DEVICE

(71) Applicant: EIZO Corporation, Hakusan (JP)

(72) Inventors: Takao Maekawa, Hakusan (JP); Kensuke Nagashima, Hakusan (JP); Atsuyoshi Deyama, Hakusan (JP); Yuito Mori, Hakusan (JP); Jun Nishimura, Hakusan (JP)

(73) Assignee: EIZO Corporation, Hakusan (JP)

( * ) Notice: Subject to any disclaimer, the term of this patent is extended or adjusted under 35 U.S.C. 154(b) by 0 days.

(21) Appl. No.: 18/551,257

(22) PCT Filed: Mar. 22, 2021

(86) PCT No.: PCT/JP2021/011792
§ 371 (c)(1),
(2) Date: Sep. 19, 2023

(87) PCT Pub. No.: WO2022/201259
PCT Pub. Date: Sep. 29, 2022

(65) Prior Publication Data
US 2024/0169955 A1    May 23, 2024

(51) Int. Cl.
*G09G 5/02* (2006.01)
*G06T 7/90* (2017.01)
(Continued)

(52) U.S. Cl.
CPC .......... *G09G 5/02* (2013.01); *G06T 7/90* (2017.01); *G06V 10/56* (2022.01); *G06V 10/761* (2022.01);
(Continued)

(58) Field of Classification Search
CPC .... G09G 5/02; G09G 2320/0666; G06T 7/90; G06T 2207/10024; G06V 10/56; G06V 10/761
See application file for complete search history.

(56) References Cited

U.S. PATENT DOCUMENTS

| | | | |
|---|---|---|---|
| 2014/0240341 A1* | 8/2014 | Oda .......................... | G09G 5/02 345/590 |
| 2020/0202809 A1* | 6/2020 | Kwon ...................... | G09G 5/02 |

FOREIGN PATENT DOCUMENTS

| | | |
|---|---|---|
| JP | 2014-042118 A | 3/2014 |
| JP | 2014-042119 A | 3/2014 |
| JP | 2017-156506 A | 9/2017 |

OTHER PUBLICATIONS

International Search Report issued on May 25, 2021, in corresponding International Application No. PCT/JP2021/011792, 6 pages.

\* cited by examiner

*Primary Examiner* — Robert J Michaud
(74) *Attorney, Agent, or Firm* — Maier & Maier, PLLC

(57) ABSTRACT

Provided is an image display system that allows many persons to use multiple monitors without feeling color differences between the monitors.
An image display system for displaying images on display devices includes multiple display devices, a spectral data acquisition unit, a candidate color matching function acquisition unit, a color difference calculation unit, and a color matching function selection unit. The spectral data acquisition unit is configured to acquire spectral data of the display devices. The candidate color matching function acquisition unit is configured to acquire multiple selection candidate color matching functions that are candidate color matching functions that may be selected by the color matching function selection unit. The color difference calculation unit is (Continued)

configured to calculate color differences between the display devices with respect to each of the selection candidate color matching functions using the spectral data. The color matching function selection unit is configured to select a color matching function that reduces color differences in appearance for many observers, from the selection candidate color matching functions on the basis of the calculated color differences.

10 Claims, 10 Drawing Sheets

(51) Int. Cl.
*G06V 10/56* (2022.01)
*G06V 10/74* (2022.01)

(52) U.S. Cl.
CPC .............. *G06T 2207/10024* (2013.01); *G09G 2320/0666* (2013.01)

FIG. 3 (FIRST EMBODIMENT)

FIG. 5

| (w=R,G,B) | SPECTRAL DATA L1 (FIRST MONIOR 3) | SPECTRAL DATA L2 (SECOND MONIOR 4) |
|---|---|---|
| COLOR MATCHING FUNCTION C1 | $S11\text{-}1=\{X11_{w1}, Y11_{w1}, Z11_{w1}\}$<br>$S11\text{-}2=\{X11_{w2}, Y11_{w2}, Z11_{w2}\}$<br>$\vdots$<br>$S11\text{-}1000=\{X11_{w1000}, Y11_{w1000}, Z11_{w1000}\}$ | $S21\text{-}1=\{X21_{w1}, Y21_{w1}, Z21_{w1}\}$<br>$S21\text{-}2=\{X21_{w2}, Y21_{w2}, Z21_{w2}\}$<br>$\vdots$<br>$S21\text{-}1000=\{X21_{w1000}, Y21_{w1000}, Z21_{w1000}\}$ |
| COLOR MATCHING FUNCTION C2 | $S12\text{-}1=\{X12_{w1}, Y12_{w1}, Z12_{w1}\}$<br>$S12\text{-}2=\{X12_{w2}, Y12_{w2}, Z12_{w2}\}$<br>$\vdots$<br>$S12\text{-}1000=\{X12_{w1000}, Y12_{w1000}, Z12_{w1000}\}$ | $S22\text{-}1=\{X22_{w1}, Y22_{w1}, Z22_{w1}\}$<br>$S22\text{-}2=\{X22_{w2}, Y22_{w2}, Z22_{w2}\}$<br>$\vdots$<br>$S22\text{-}1000=\{X22_{w1000}, Y22_{w1000}, Z22_{w1000}\}$ |
| COLOR MATCHING FUNCTION C3 | $S13\text{-}1=\{X13_{w1}, Y13_{w1}, Z13_{w1}\}$<br>$S13\text{-}2=\{X13_{w2}, Y13_{w2}, Z13_{w2}\}$<br>$\vdots$<br>$S13\text{-}1000=\{X13_{w1000}, Y13_{w1000}, Z13_{w1000}\}$ | $S23\text{-}1=\{X23_{w1}, Y23_{w1}, Z23_{w1}\}$<br>$S23\text{-}2=\{X23_{w2}, Y23_{w2}, Z23_{w2}\}$<br>$\vdots$<br>$S23\text{-}1000=\{X23_{w1000}, Y23_{w1000}, Z23_{w1000}\}$ |
| COLOR MATCHING FUNCTION C4 | $S14\text{-}1=\{X14_{w1}, Y14_{w1}, Z14_{w1}\}$<br>$S14\text{-}2=\{X14_{w2}, Y14_{w2}, Z14_{w2}\}$<br>$\vdots$<br>$S14\text{-}1000=\{X14_{w1000}, Y14_{w1000}, Z14_{w1000}\}$ | $S24\text{-}1=\{X24_{w1}, Y24_{w1}, Z24_{w1}\}$<br>$S24\text{-}2=\{X24_{w2}, Y24_{w2}, Z24_{w2}\}$<br>$\vdots$<br>$S24\text{-}1000=\{X24_{w1000}, Y24_{w1000}, Z24_{w1000}\}$ |

COLOR DIFFERENCE $Dmi = S1m\text{-}i - S2m\text{-}i$
$(m=1\sim4, i=1\sim1000)$

FIG. 7  (SECOND EMBODIMENT)
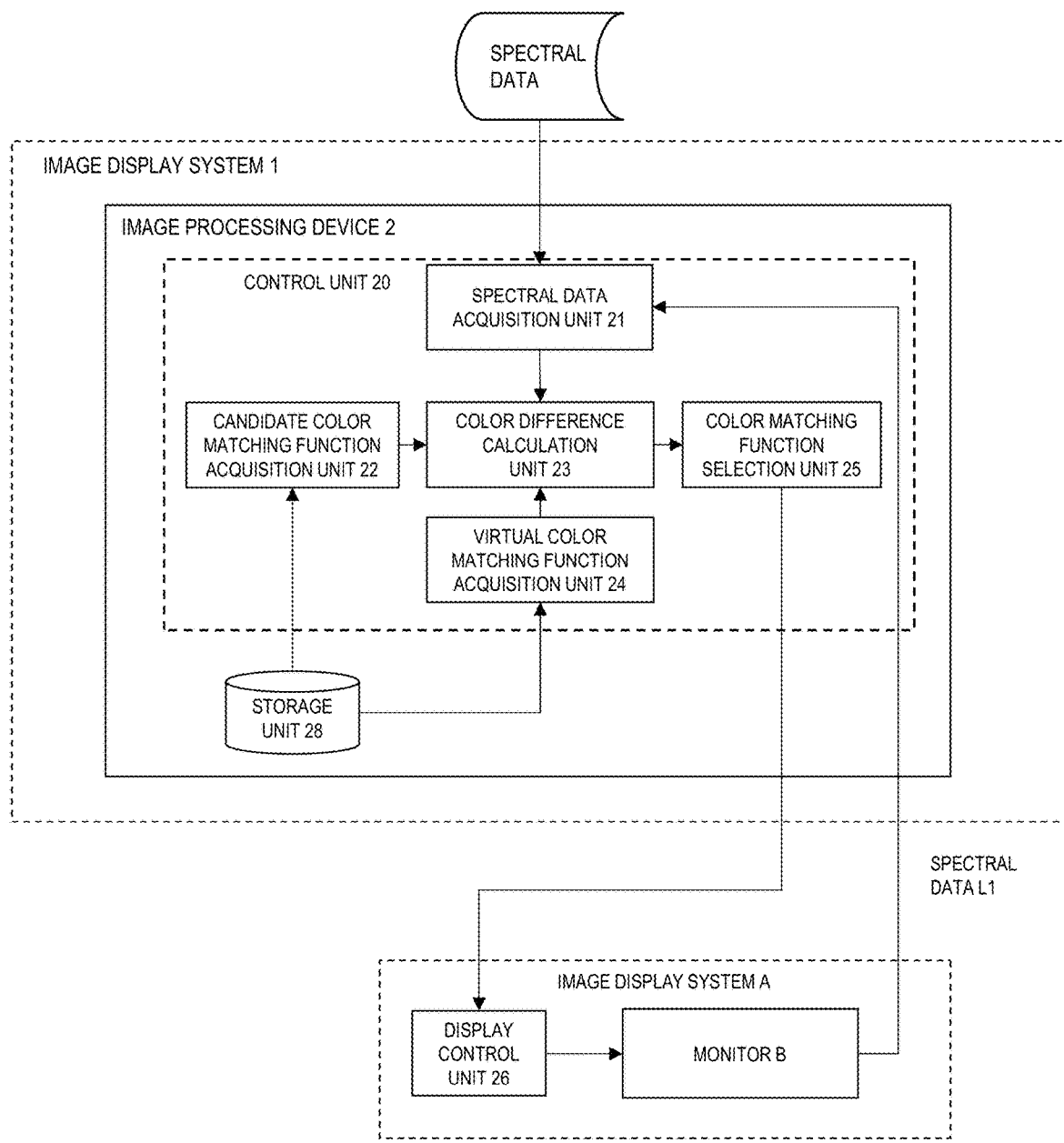

FIG. 8 (SECOND EMBODIMENT)
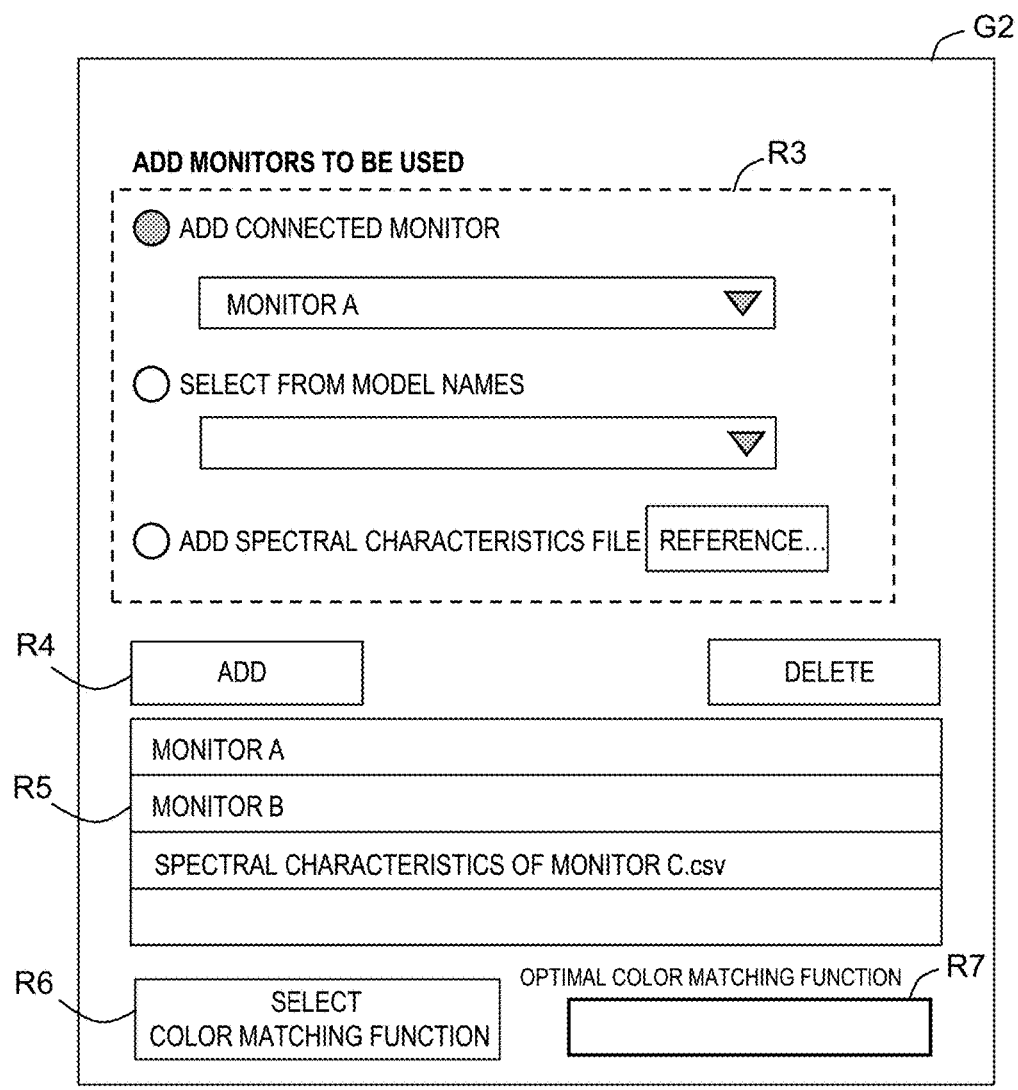

FIG. 9   (SECOND EMBODIMENT / MODIFICATION)
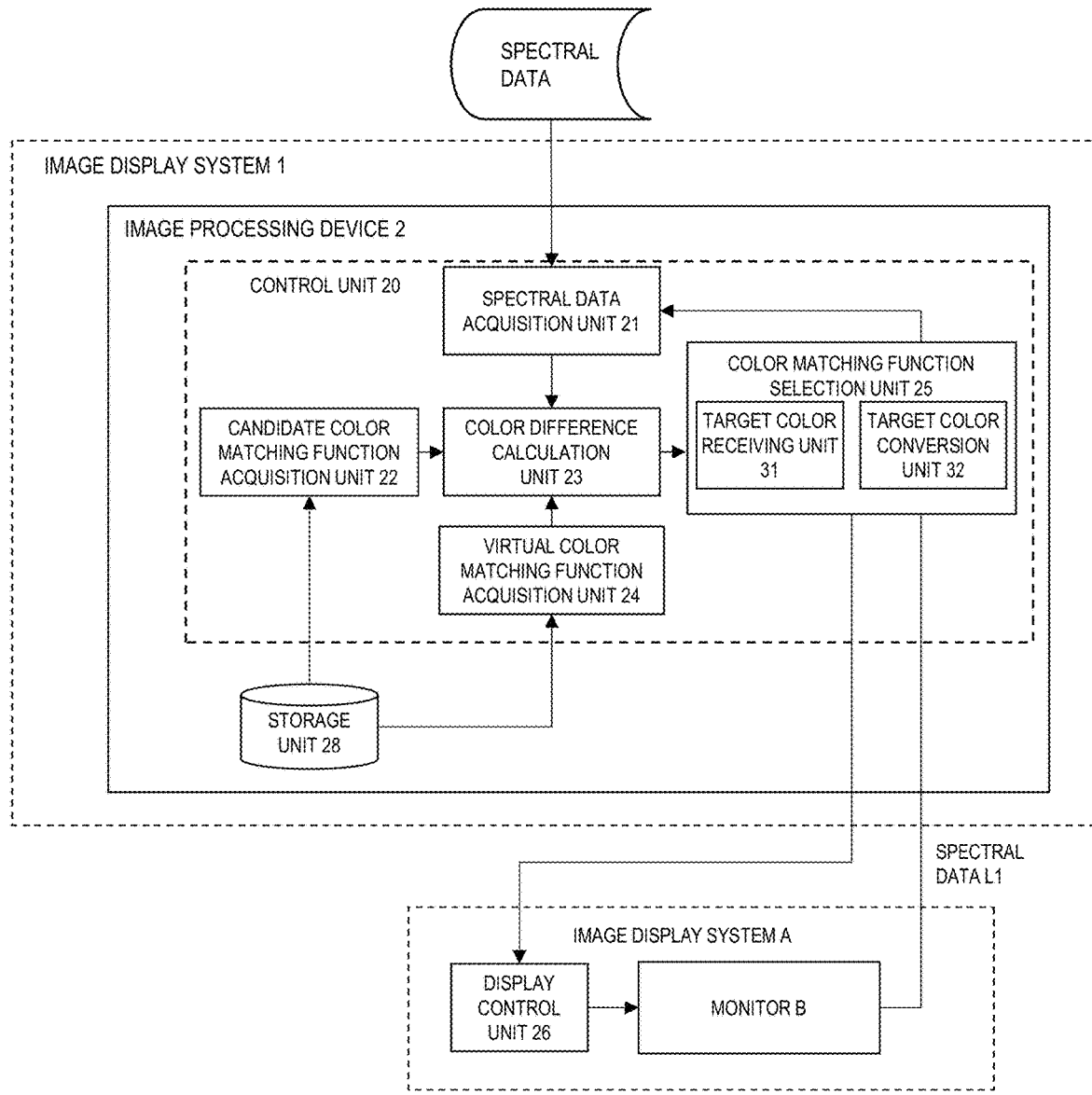

FIG. 10   (SECOND EMBODIMENT / MODIFICATION)
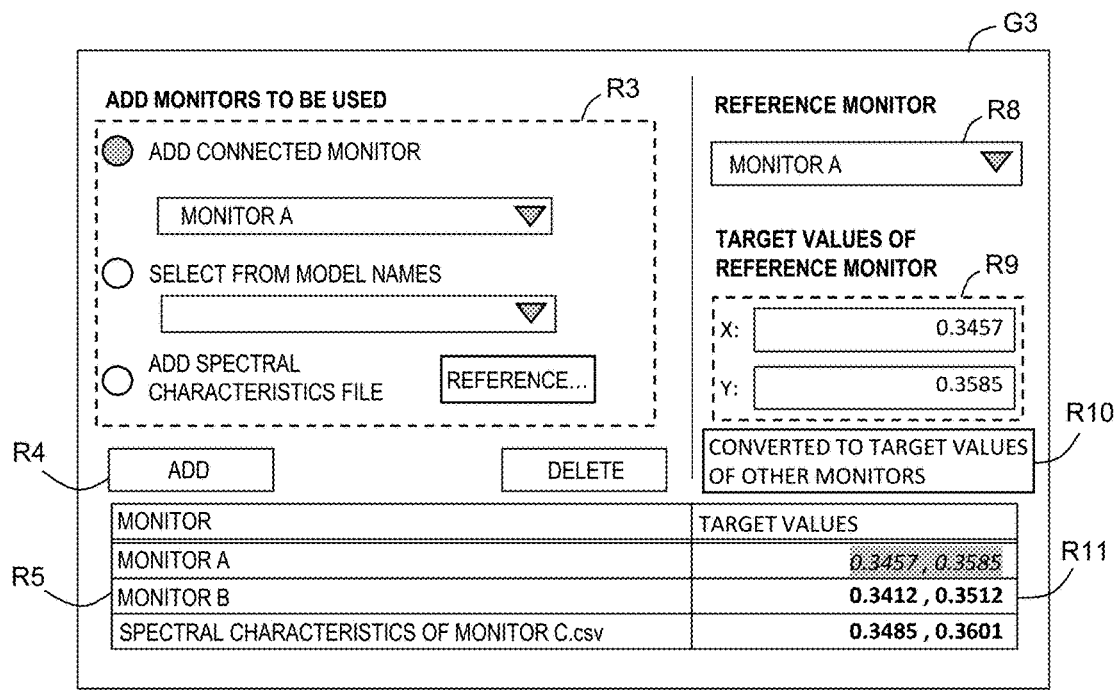

IMAGE DISPLAY SYSTEM, IMAGE DISPLAY METHOD, IMAGE DISPLAY PROGRAM, AND IMAGE DISPLAY DEVICE

TECHNICAL FIELD

The present invention relates to an image display system, image display method, image display program, and multiple image display devices.

BACKGROUND ART

Technologies that consider the differences in spectral characteristics between display devices have been developed in recent years. For example, Patent Literature 1 discloses a data processing device that suppresses variations in the appearance of colors caused by variations in the color matching function.

Citation List

Patent Literature

[Patent Literature 1] Japanese Unexamined Patent Application Publication No. 2014-42119

SUMMARY OF INVENTION

Technical Problem

It is assumed that a user uses multiple display devices simultaneously. In this case, even if the chromaticities of the different two display devices are adjusted to the same chromaticity using a measuring instrument, the colors in appearance on the display devices may not match each other depending on the observer. This occurs when the display devices have different spectral characteristics and a color matching function used in colorimetry and the color matching function of the observer differ from each other.

The present invention has been made in view of the foregoing, and an object thereof is to provide an image display system that allows many persons to use multiple display devices without feeling color differences between the display devices.

Solution to Problem

One aspect of the present invention provides an image display system for displaying images on display devices. The image display system includes multiple display devices, a spectral data acquisition unit, a candidate color matching function acquisition unit, a color difference calculation unit, and a color matching function selection unit. The spectral data acquisition unit is configured to acquire spectral data of the display devices. The candidate color matching function acquisition unit is configured to acquire multiple selection candidate color matching functions that are candidate color matching functions that may be selected by the color matching function selection unit. The color difference calculation unit is configured to calculate color differences between the display devices with respect to each of the selection candidate color matching functions using the spectral data. The color matching function selection unit is configured to select a color matching function that reduces color differences in appearance for many observers, from the selection candidate color matching functions on the basis of the calculated color differences.

Such a configuration is able to select the optimal color matching function that prevents many persons from feeling color differences between the display devices.

Various embodiments of the present invention are described below. The embodiments described below can be combined with each other. The features thereof independently constitute the invention.

Preferably, the image display system further includes a display control unit, and the display control unit is configured to control display of the display devices using the color matching function selected by the color matching function selection unit.

Preferably, the image display system further includes a virtual color matching function acquisition unit, the virtual color matching function acquisition unit is configured to acquire multiple virtual color matching functions corresponding to virtual observers, and the color difference calculation unit is configured to calculate tristimulus values on the basis of the spectral data and the virtual color matching functions, and to calculate the color differences between the display devices.

Preferably, in the image display system, the color difference calculation unit is configured to calculate the color differences between the display devices for the number of acquired virtual color matching functions, and the color matching function selection unit is configured to select a color matching function to be used to display images from the selection candidate color matching functions on the basis of the calculated color differences for the number of virtual color matching functions.

Preferably, the image display system further includes a storage unit storing the spectral data.

Preferably, the image display system further includes a storage unit storing the virtual color matching functions.

Preferably, the image display system further includes a target color receiving unit and a target color conversion unit, the target color receiving unit is configured to receive target color values of a reference display of the display devices, and the target color conversion unit is configured to convert the target color value into color values using the color matching function selected by the color matching function selection unit.

Another aspect of the present invention provides a method for causing a computer to function as an image display system for displaying images on display devices. The image display system includes multiple display devices. The method includes a spectral data acquisition step, a candidate color matching function acquisition step, a color difference calculation step, and a color matching function selection step. The spectral data acquisition step includes acquiring, by the computer, spectral data of the display devices. The candidate color matching function acquisition step includes acquiring, by the computer, multiple selection candidate color matching functions that are candidate color matching functions that may be selected in the color matching function selection step. The color difference calculation step includes calculating, by the computer, color differences between the display devices with respect to each of the selection candidate color matching functions using the spectral data. The color matching function selection step includes selecting, by the computer, a color matching function that reduces color differences in appearance for many observers, from the selection candidate color matching functions on the basis of the calculated color differences.

Yet another aspect of the present invention provides a program for causing a computer to function as an image display system for displaying images on display devices.

The image display system includes multiple display devices. The program causes the computer to perform a spectral data acquisition step, a candidate color matching function acquisition step, a color difference calculation step, and a color matching function selection step. The spectral data acquisition step includes acquiring, by the computer, spectral data of the display devices. The candidate color matching function acquisition step includes acquiring, by the computer, multiple selection candidate color matching functions that are candidate color matching functions that may be selected in the color matching function selection step. The color difference calculation step includes calculating, by the computer, color differences between the display devices with respect to each of the selection candidate color matching functions using the spectral data. The color matching function selection step includes selecting, by the computer, a color matching function that reduces color differences in appearance for many observers, from the selection candidate color matching functions on the basis of the calculated color differences.

Still yet another aspect of the present invention provides display device for displaying images. The display devices include a spectral data acquisition unit, a candidate color matching function acquisition unit, a color difference calculation unit, and a color matching function selection unit. The spectral data acquisition unit is configured to acquire spectral data of the display devices. The candidate color matching function acquisition unit is configured to acquire multiple selection candidate color matching functions that are candidate color matching functions that may be selected by the color matching function selection unit. The color difference calculation unit is configured to calculate color differences between the display devices with respect to each of the selection candidate color matching functions using the spectral data. The color matching function selection unit is configured to select a color matching function that reduces color differences in appearance for many observers, from the selection candidate color matching functions on the basis of the calculated color differences.

BRIEF DESCRIPTION OF DRAWINGS

FIG. 5 is a diagram showing tristimulus values and color differences calculated by a color difference calculation unit 23.

FIG. 7 is a block diagram showing the functional components of an image display system 1 according to a second embodiment.

FIG. 8 is a diagram showing a color matching function setting screen G2 according to the second embodiment.

FIG. 9 is a block diagram showing the functional components of an image display system 1 according to a modification of the second embodiment.

FIG. 10 is a diagram showing a color matching function setting screen G3 according to the modification of the second embodiment.

DESCRIPTION of EMBODIMENTS

1. Spectral Characteristics and Color Matching Function

Figure 1A:
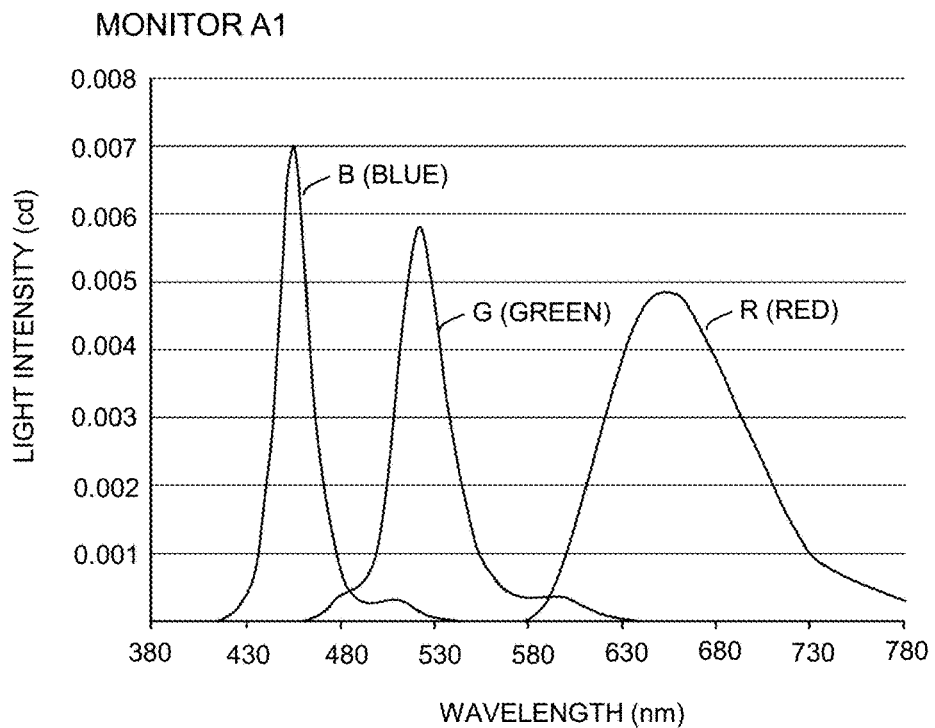
FIGS. 1A and 1B are graphs showing the spectral characteristics and color matching functions between display devices.
Figure 1B:
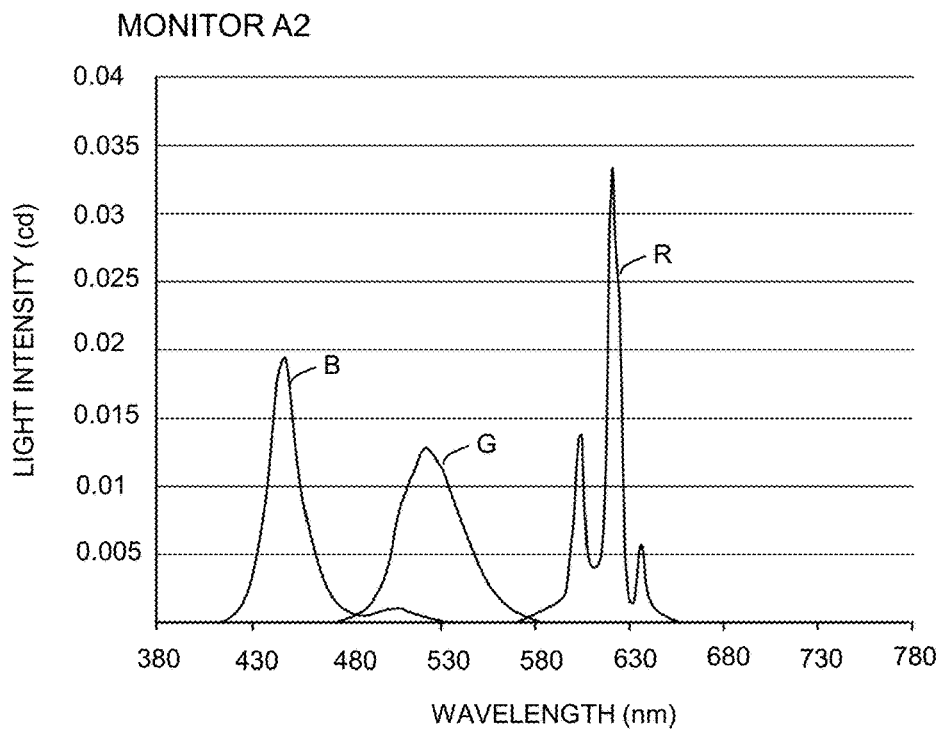

Referring to FIGS. 1A and 1B, spectral characteristics and a color matching function will be described. FIGS. 1A and 1B are graphs showing the differences in spectral characteristics between different monitors.

Clear differences are observed between the spectral characteristics of a monitor A1 shown in FIG. 1A and the spectral characteristics of a monitor A2 shown in FIG. 1B, particularly between the R (red) spectral distributions. As seen above, the monitors have different RGB spectral distributions.

When the white points of different monitors are adjusted using a measuring instrument, the intensities of RGB light are adjusted. In this case, the intensities of RGB light are adjusted with the shape of the RGB spectral distributions maintained. For this reason, even if the white points of the different monitors are adjusted so as to become the same XYZ values, the differences in spectral characteristics between the monitors are not eliminated.

The problem here is the color matching function of the observer. The color matching function represents the degree to which the L cones (red cones), M cones (green cones), and S cones (blue cones) of a person react to light having respective wavelengths and depends on the person. When the color matching function of the vision of the observer does not match a color matching function assumed by the measuring instrument, the observer observes the colors on the different monitors as different colors even if the white points of the monitors are adjusted using that measuring instrument so as to become the same XYZ values. For this reason, it is necessary to select the optimal color matching function that allows as many persons as possible not to feel color differences.

2. First Embodiment 2.1. Hardware Components of Image Display System 1

Figure 2:
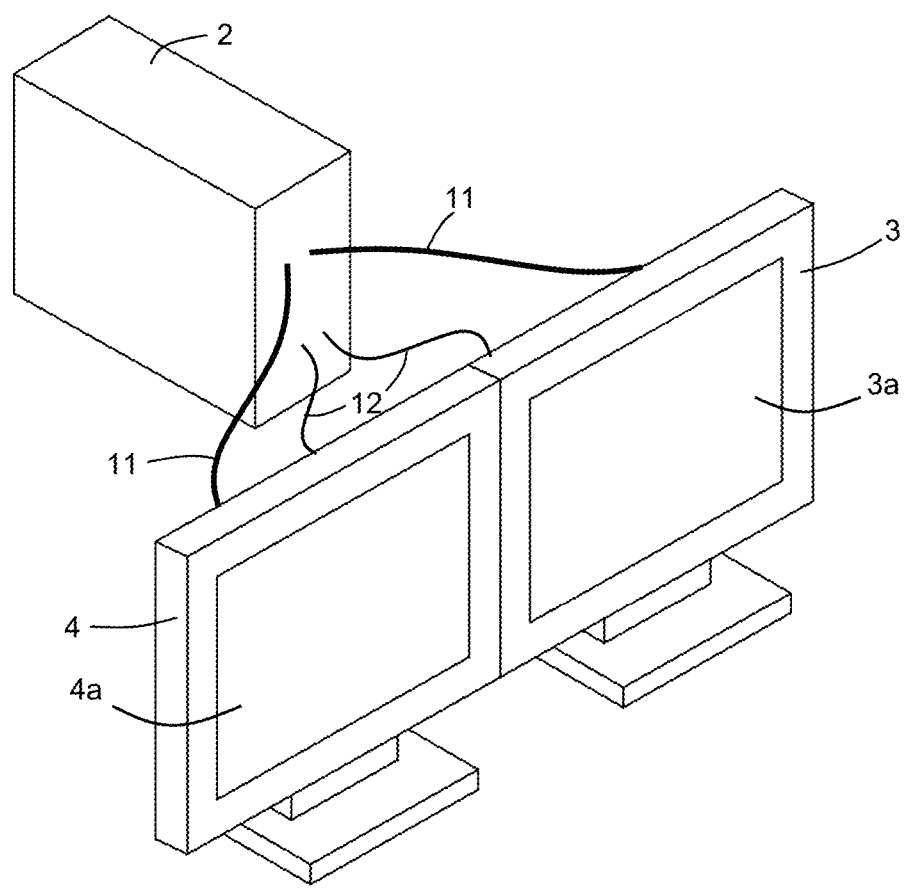
FIG. 2 is a drawing showing the hardware components of an image display system 1 according to a first embodiment.

Referring to FIG. 2, the hardware components of an image display system 1 will be described. As shown in FIG. 2, the image display system 1 includes an image processing device 2, a first monitor 3, and a second monitor 4. The image display system 1 is installed in, for example, an examination room in a hospital. Or, it may be installed in a photograph studio or video editing studio.

The image processing device 2 and the first monitor 3 and second monitor 4 are configured to be able to communicate with each other through video signal cables 11 and control signal cables 12. The image processing device 2 transmits image data to the first monitor 3 and second monitor 4 through the video signal cables 11.

Images are displayed on the display screen 3a of the first monitor 3 and the display screen 4a of the second monitor 4 on the basis of the image data transmitted from the image processing device 2. The image processing device 2 and the first monitor 3 and second monitor 4 transmit and receive control signals and data to and from each other through the control signal cables 12.

1.2. Functional Components of Image Display System 1

Figure 3:
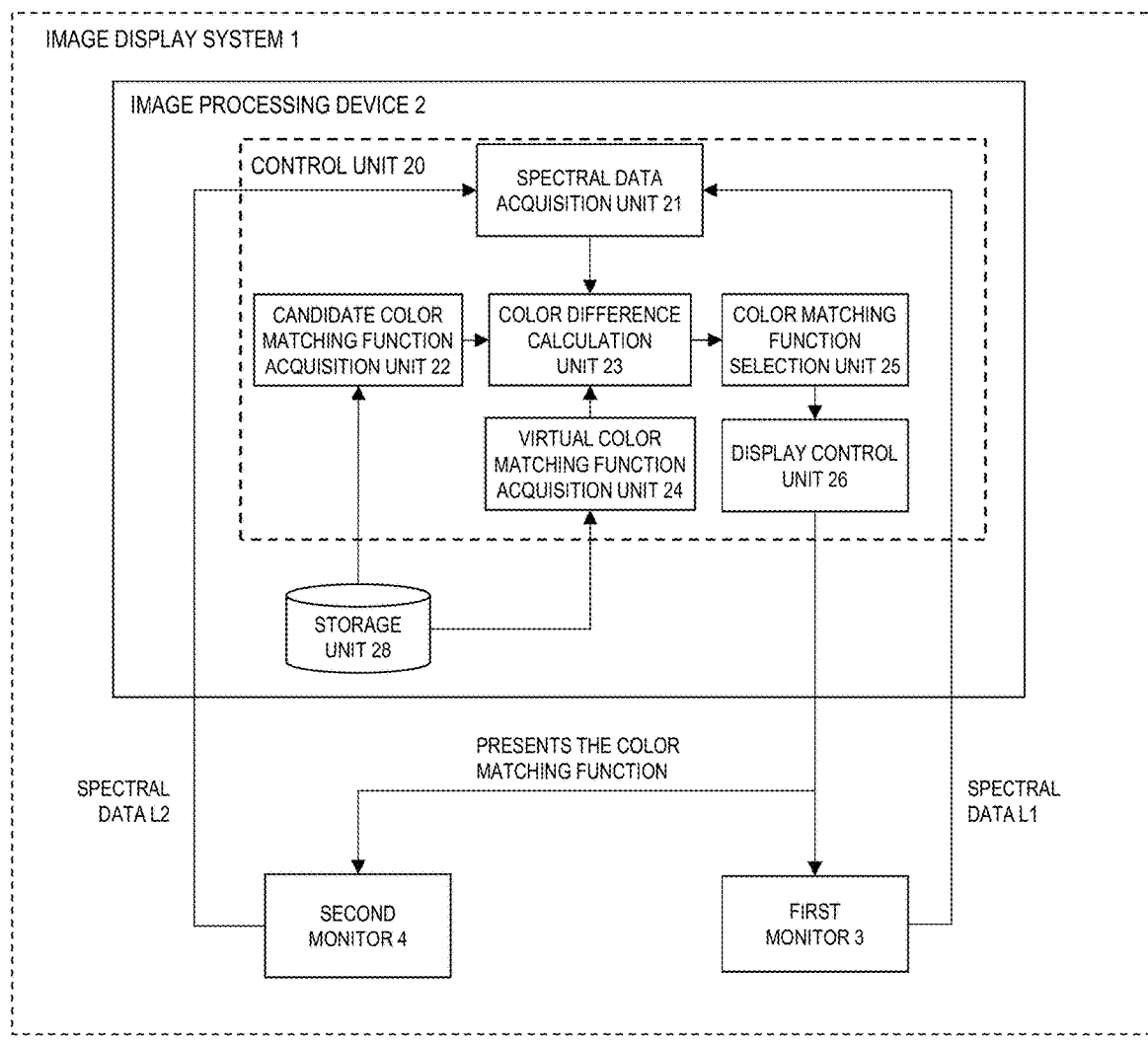
FIG. 3 is a block diagram showing the functional components of the image display system 1 according to the first embodiment.

Referring to FIG. 3, the functional components of the image display system 1 will be described. As described above, the image display system 1 includes the image processing device 2, first monitor 3, and second monitor 4. The image processing device 2 includes a control unit 20 and a storage unit 28. The control unit 20 includes a spectral data acquisition unit 21, a candidate color matching function acquisition unit 22, a color difference calculation unit 23, a virtual color matching function acquisition unit 24, a color matching function selection unit 25, and a display control unit 26.

The spectral data acquisition unit 21 acquires spectral data of output light outputted from the first monitor 3 and second monitor 4. The candidate color matching function acquisition unit 22 acquires multiple selection candidate color matching functions, which are candidate color matching functions that may be selected by the color matching function selection unit 25.

The color difference calculation unit 23 calculates the color differences between the monitors with respect to each of the selection candidate color matching functions using the spectral data of the first monitor 3 and second monitor 4. The color matching function selection unit 25 selects the optimal color matching function to be used by the display control unit 26 from the selection candidate color matching functions on the basis of the calculated color differences. The virtual color matching function acquisition unit 24 acquires virtual color matching functions corresponding to virtual observers.

The display control unit 26 controls the output of image data displayed on the first monitor 3 and second monitor 4, as well as controls the display of the monitors using the color matching function selected by the color matching function selection unit 25. Details of these processes performed by the control unit 20 will be described later. The storage unit 28 stores data on the selection candidate color matching functions and the virtual color matching functions.

The first monitor 3 and second monitor 4 are monitors for displaying radiological interpretation image data such as X-ray images, text image data such as patients' medical records, or image data such as photographs or illustrations and consist of, for example, liquid crystal displays, organic EL displays, touchscreen displays, electronic paper, or any other type of displays.

The above components may be implemented by software or hardware. In the case of software, the components are implemented by execution of a program by the CPU. The program may be stored in a storage unit (memory, HDD, SSD or the like) included in the image processing device 2, or may be stored in a computer-readable, non-transitory storage medium.

The program stored in an external storage unit may be read and executed by so-called "cloud computing." In the case of hardware, the components may be implemented by various types of circuits, such as ASIC, FPGA, and DRP.

1.3. Processes by Control Unit 20

Figure 4:
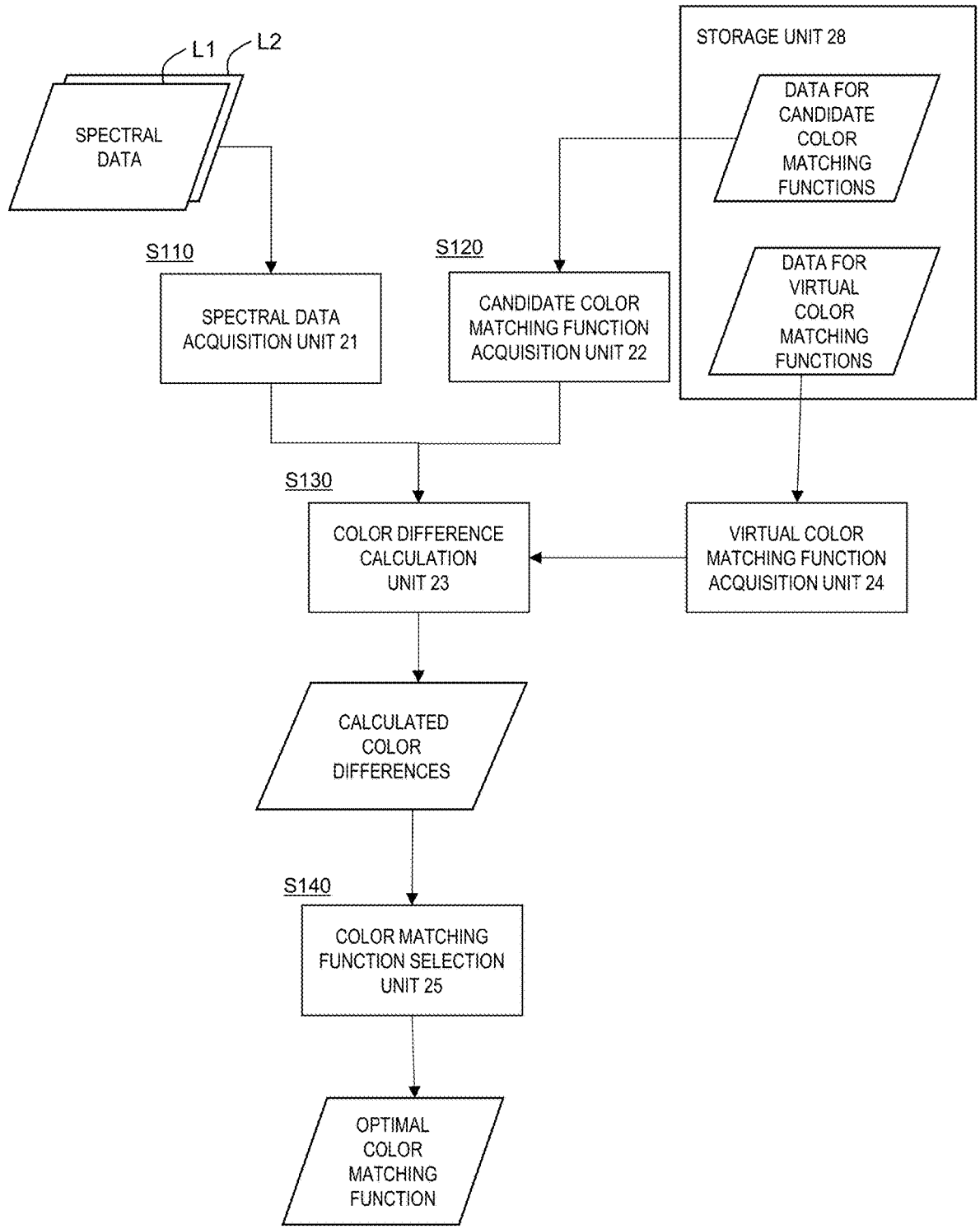
FIG. 4 is a diagram showing the flow of a process performed by an image processing device 2.

Referring to FIG. 4, the processes performed by the control unit 20 will be described. Note that the processes performed by the control unit 20 described below is only illustrative and details of the processes are not limiting.

In step S110, the spectral data acquisition unit 21 of the control unit 20 acquires spectral data L1 of output light from the first monitor 3 and spectral data L2 of output light from the second monitor 4. In the present embodiment, the spectral data L1 and L2 are previously measured by a spectral measuring instrument and are stored in storage units included in the first monitor 3 and second monitor 4.

In step S120, the candidate color matching function acquisition unit 22 acquires, from the storage unit 28, the selection candidate color matching functions, which are candidate color matching functions that may be selected by the color matching function selection unit 25. The storage unit 28 is storing the previously selected multiple color matching functions such as standardized color matching functions, as selection candidates. In the following description it is assumed that four color matching functions C1 to C4 described below are stored as selection candidates.

C1: CIE1931 CMF
C2: CIE1964 CMF
C3: CIE2006_10-deg_50-age_CMF
C4: CIE2015 CMF

The virtual color matching function acquisition unit 24 acquires color matching functions corresponding to many virtual observers (in the present disclosure, also referred to as the virtual color matching functions). In the present embodiment, virtual color matching functions corresponding to, for example, random 1000 persons are previously created and stored in the storage unit 28.

In step S130, the color difference calculation unit 23 calculates the color differences between the monitors with respect to each of the calculation candidate color matching functions using the spectral data L1 and L2. The color differences here are color differences in a numerical form calculated from tristimulus values. The tristimulus values are values obtained by integrating the product of the color matching function and light intensity at a certain wavelength over the wavelength of visible light. With respect to spectral data Ln (n=1, 2) and color matching functions Cm (m=1 to 4), the tristimulus values $Xn_R$, $Yn_R$, and $Zn_R$ of R (red) are obtained by the following Formulas (1) to (3).

[Formula 1]
$$Xnm_R = k \int_{360}^{780} Ln_R(\lambda) Cm_X(\lambda) d\lambda \quad (1)$$

$(n = 1, 2 / m = 1\sim4)$

[Formula 2]
$$Ynm_R = k \int_{360}^{780} Ln_R(\lambda) Cm_Y(\lambda) d\lambda \quad (2)$$

$(n = 1, 2 / m = 1\sim4)$

[Formula 3]
$$Znm_R = k \int_{360}^{780} Ln_R(\lambda) Cm_Z(\lambda) d\lambda \quad (3)$$

$(n = 1, 2 / m = 1\sim4)$

In these formulas, k represents a constant representing the maximum luminous efficacy, $Ln_R(\lambda)$ represents the spectral distribution of the R component at a wavelength $\lambda$ with respect to the spectral data Ln, and Cmp (p=X,Y,Z) represents the p component of the color matching function Cm in an XYZ color system. Similarly, the tristimulus values $Xnm_G$, $Ynm_G$, and $Znm_G$ of G (green) and the tristimulus values $Xnm_B$, $Ynm_B$, and $Znm_B$ of B (blue) are also obtained.

The color difference calculation unit 23 then calculates, for spectral data Ln, the spectral distributions when the target white point is realized using the four color matching functions C1 to C4, which are candidates for selection. The tristimulus values $Xnm_T$, $Ynm_T$, and $Znm_T$ of the target white point are represented by the following Formula (4).

[Formula 4]

$$\begin{bmatrix} Xnm_t \\ Ynm_t \\ Znm_t \end{bmatrix} = \begin{bmatrix} Xnm_R & Xnm_G & Xnm_B \\ Ynm_R & Ynm_G & Ynm_B \\ Znm_R & Znm_G & Znm_B \end{bmatrix} \begin{bmatrix} Gnm_R \\ Gnm_G \\ Gnm_B \end{bmatrix} \quad (4)$$

In this formula, $Gnm_R$, $Gnm_G$, and $Gnm_B$ represent the intensities (also referred to as the gains) of RGB. By solving the following Formula (5) obtained by deforming Formula (4), $Gnm_R$, $Gnm_G$, and $Gnm_B$ with respect to the spectral data Ln and color matching function Cm are obtained.

[Formula 5]

$$\begin{bmatrix} Xnm_R & Xnm_G & Xnm_B \\ Ynm_R & Ynm_G & Ynm_B \\ Znm_R & Znm_G & Znm_B \end{bmatrix}^{-1} \begin{bmatrix} Xnm_t \\ Ynm_t \\ Znm_t \end{bmatrix} = \begin{bmatrix} Gnm_R \\ Gnm_G \\ Gnm_B \end{bmatrix} \quad (5)$$

By multiplying the $Gnm_W$ (w=R,G,B) obtained and the spectral distribution $Ln_W$, target white point-adjusted spectral distribution data Lnm'w with respect to the spectral data Ln and color matching function Cm is calculated, as shown in the following Formula (6).

[Formula 6]

$Lnm'_R(\lambda) = Gnm_R \cdot Ln_R(\lambda)$ $Lnm'_G(\lambda) = Gnm_G \cdot Ln_G(\lambda)$ $Lnm'_B(\lambda) = Gnm_B \cdot Ln_B(\lambda)$ $Lnm'_W(\lambda) = Lnm'_R(\lambda) + Lnm'_G(\lambda) + Lnm'_B(\lambda)$ \quad (6)

In this way, the spectral distribution data Lnm'w(λ) is calculated with respect to each of the spectral data Ln (n=1, 2) and the selection candidate color matching functions Cm (m=1 to 4).

The color difference calculation unit 23 then calculates the tristimulus values of the virtual color matching functions Fi (i=1 to 1000) corresponding to the 1000 persons acquired by the virtual color matching function acquisition unit 24 using the following Formulas (7) to (9) with respect to the calculated target white point-adjusted spectral distribution data Lnm'w(λ).

[Formula 7]

$$Xnm_W = k \int_{360}^{780} Lnm'_W(\lambda) F_{Xi}(\lambda) d\lambda \quad (7)$$

[Formula 8]

$$Ynm_W = k \int_{360}^{780} Lnm'_W(\lambda) F_{Yi}(\lambda) d\lambda \quad (8)$$

[Formula 9]

$$Znm_W = k \int_{360}^{780} Lnm'_W(\lambda) F_{Zi}(\lambda) d\lambda \quad (9)$$

In these formulas, Fpi (p=X,Y,Z) represents the p component of the virtual color matching function Fi in the XYZ color system. Thus, as shown in FIG. 5, for each spectral data Ln (n=1,2) and each selection candidate color matching functions Cm (m=1 to 4), a set of tristimulus values Snm-i is calculated, assuming virtual color matching functions corresponding to the 1000 persons. The color difference calculation unit 23 calculates the difference between S1m-i and S2m-i (i=1 to 1000) as the color difference Dmi between the spectral data L1 and spectral data L2 with respect to each of the selection candidate color matching functions Cm (m=1 to 4).

In step S140, the color matching function selection unit 25 selects a color matching function to be used by the display control unit 26 from the selection candidate color matching functions on the basis of the calculated color differences Dmi. The color matching function selection unit 25 evaluates the color differences Dmi of the selection candidate color matching functions Cm (m=1 to 4) and selects the optimal color matching function that allows as many persons as possible not to feel color differences.

Various techniques can be used as methods for evaluating the color differences Dmi. For example, the display control unit 26 may calculate the average of the calculated 1000 color differences Dmi for each of the color matching functions Cm and select a color matching function Cm having the smallest average color difference as the optimal color matching function.

Or, the display control unit 26 may select the smallest color difference Dmi for each i (=1 to 1000) and select Cm having the largest number of selected Dmi as the optimal color matching function.

Or, the display control unit 26 may set the threshold of the color difference and select Cm having the largest number of Dmi falling below the threshold as the optimal color matching function.

The display control unit 26 presents the color matching function selected by the color matching function selection unit 25 to the user by displaying the color matching function on the monitors. The display control unit 26 may be configured to, when receiving an instruction to apply the presented color matching function from the user, perform an adjustment process of adjusting the display of the first monitor and second monitor using the color matching function.

If the measuring instrument used by the user in the adjustment process is not of a spectral type but of a filter type, a process of creating a conversion matrix in an XYZ space and converting the measurement values of the measuring instrument into a measured value corresponding to the selected color matching function may be performed. As seen above, even if the measuring instrument used by the user is not of a spectral type, the image display system 1 can be used.

1.4. Color Matching Function Setting Screen

Figure 6:
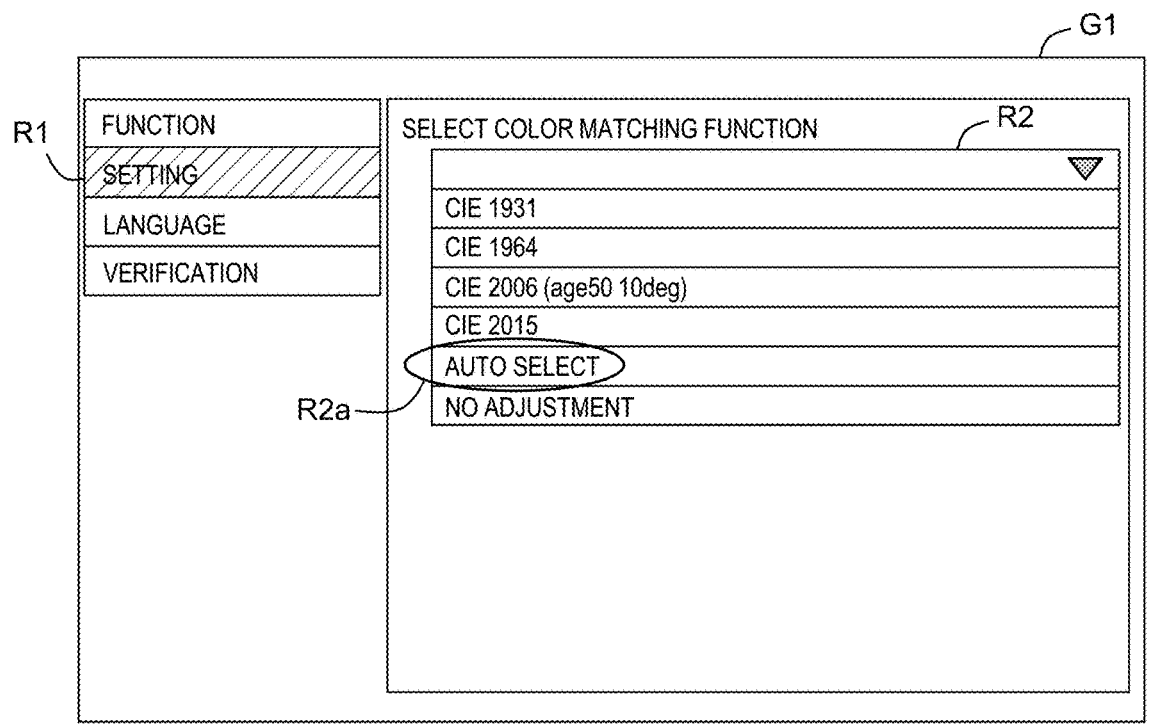
FIG. 6 is a diagram showing a color matching function setting screen G1 according to the first embodiment.

FIG. 6 shows an example of a setting screen G1 for selecting a color matching function according to the present embodiment. In the present embodiment, the user selects a setting menu R1 on the setting screen G1. When the user expands the pulldown of a color matching function selection list box R2 and selects an automatic selection menu R2a, the above steps S110 to S140 are performed so that the optimal color matching function is selected from the color matching functions C1 to C4. The display control unit 26 then adjusts the first monitor and second monitor using the optimal color matching function.

As seen above, in the present embodiment, the optimal color matching function is automatically obtained on the basis of the spectral data stored in the first monitor 3 and second monitor 4. That is, the optimal color matching function that allows as many persons as possible not to feel color differences is selected without the user having to measure the spectral distributions of the monitors or adjust the color matching function. Since the spectral distributions of the monitors only have to be measured at the time of factory adjustment or development, a high-accuracy measuring instrument can be used.

3. Second Embodiment

Referring to FIGS. 7 and 8, a second embodiment of the invention of the present application will be described focusing on the difference from the above embodiment. The second embodiment differs from the first embodiment in that a user inputs spectral data of the monitor of another image display system.

3.1. Description of Functions

As shown in FIG. 7, an image processing device 2 of an image display system 1 according to the second embodiment is communicatively connected to another image display system A including a monitor B. The user inputs spectral data of other monitors used simultaneously with the monitor B, and a spectral data acquisition unit 21 acquires the spectral data. In this case, the user may connect the other monitors to the image processing device 2 and then input the spectral data, or may select the model names of the other monitors and input the representative value of the models as spectral data. Or, the user may input the spectral data by causing the image processing device 2 to read spectral characteristics files (for example, in a csv format) of the other monitors.

FIG. 8 shows an example of a setting screen G2 for selecting a color matching function according to the second embodiment. The user sets a group of multiple monitors to be used simultaneously by making input to a monitor addition screen R3 and operating an addition button R4.

The monitors set by the user are displayed in a group display area R5. When the user operates a color matching function selection button R6, the optimal color matching function corresponding to the spectral characteristics of the monitors displayed in the group display area R5 is selected and presented in a color matching function presentation area R7.

The above functions can be implemented by installing a program for implementing the functions in an existing image processing device. That is, advantageous effects similar to those of the first embodiment can be obtained, and the technical idea of the present application can be realized.

3.2. Modification

Referring to FIGS. 9 and 10, a modification of the second embodiment will be described. This modification differs from the above embodiment in that the target value of monitors are converted into color values adjusted with the optimal color matching function.

As shown in FIG. 9, in the modification, a color matching function selection unit 25 includes a target color receiving unit 31 and a target color conversion unit 32. Details of processes performed by the target color receiving unit 31 and target color conversion unit 32 will be described later.

FIG. 10 shows an example of a setting screen G3 for selecting a color matching function according to the modification. In the modification, a user adds a group of multiple monitors to a group display area R5 and then selects a reference monitor from a reference monitor list R8.

The user then inputs color values to a target color setting area R9. Then, the target color receiving unit 31 receives them as target color values obtained by adjusting the reference monitor using a predetermined color matching function (for example, CIE1931).

When the user operates a target calculation button R10, the target color conversion unit 32 calculates a spectral distribution when the reference monitor is adjusted to the target color values using a predetermined color matching function, and converts the result of the calculation to a color values with the color matching function selected by the color matching function selection unit 25. The target color conversion unit 32 then calculates the spectral distribution when the measured values of the monitors in the group display area R5 are adjusted to the converted measured values using the color matching function selected by the color matching function selection unit. Further, the target color conversion unit 32 converts the calculated spectral distributions (hereinafter referred to as the adjusted spectral distribution) into measured values using the predetermined color matching function. The conversion results are then displayed in a target value display area R11 as the target values.

As seen above, display similar to that obtained by adjusting the color value using the optimal color matching function is realized by using the color matching function included in the monitors.

4. Other Embodiments

The application of the present invention is not limited to the above embodiments. For example, while, in the first embodiment, the spectral data acquisition unit 21 acquires the spectral data L1 and L2 stored in the first monitor 3 and second monitor 4, this configuration is not limiting. For example, the spectral data acquisition unit 21 may acquire the spectral data L1 and L2 stored in the storage unit 28 or the spectral data L1 and L2 stored in an external hard disk, a USB memory, or the like. Or, the spectral data acquisition unit 21 may directly acquire spectral data measured using a spectrophotometer on the spot.

While, in the first embodiment, the image display system 1 includes the first monitor 3 and second monitor 4, this configuration is not limiting and the image display system 1 may include three or more monitors.

While, in the second embodiment, the image processing device 2 of the image display system 1 and the monitor B of the other image display system A are connected to each other, this configuration is not limiting. That is, the image processing device 2 may be configured to, when the user inputs the spectral data of simultaneously used multiple monitors to the spectral data acquisition unit 21, select the optimal color matching function corresponding to the spectral data of the monitors.

The present invention may be embodied as a program for causing a computer to function as the above image display system.

The present invention may also be embodied as a computer-readable, non-transitory storage medium storing the above program.

While the various embodiments according to the present invention have been described, the embodiments are only illustrative and are not intended to limit the scope of the invention. These novel embodiments can be carried out in other various forms, and various omissions, replacements, or changes can be made thereto without departing from the spirit of the invention. The embodiments and modifications thereof are included in the spirit and scope of the present invention, as well as included in the scope of the invention set forth in the claims and equivalents thereof.

DESCRIPTION OF REFERENCE SIGNS

1: image display system, 2: image processing device, 3: first monitor, 3a: display screen, 4: second monitor, 4a: display screen, 11: video signal cable, 12: control signal cable, 20: control unit, 21: spectral data acquisition unit, 22: candidate color matching function acquisition unit, 23: color difference calculation unit, 24: virtual color matching function acquisition unit, 25: color matching function selection unit, 26: display control unit, 28: storage unit

The invention claimed is:

1. An image display system for displaying images on display devices, comprising:
   a plurality of display devices;
   a spectral data acquisition unit;
   a candidate color matching function acquisition unit;
   a color difference calculation unit; and
   a color matching function selection unit, wherein,
   the spectral data acquisition unit is configured to acquire spectral data of the display devices,
   the candidate color matching function acquisition unit is configured to acquire a plurality of selection candidate color matching functions that are candidate color matching functions that may be selected by the color matching function selection unit,
   the color difference calculation unit is configured to calculate color differences between the display devices with respect to each of the selection candidate color matching functions using the spectral data, and
   the color matching function selection unit is configured to select a color matching function that reduces color differences in appearance for many observers, from the selection candidate color matching functions on the basis of the calculated color differences.

2. The image display system of claim 1, further comprising a display control unit, wherein
   the display control unit is configured to control display of the display devices using the color matching function selected by the color matching function selection unit.

3. The image display system of claim 1, further comprising a virtual color matching function acquisition unit,
   wherein the virtual color matching function acquisition unit is configured to acquire a plurality of virtual color matching functions corresponding to virtual observers, and
   wherein the color difference calculation unit is configured to calculate tristimulus values on the basis of the spectral data and the virtual color matching functions, and to calculate the color differences between the display devices.

4. The image display system of claim 3,
   wherein the color difference calculation unit is configured to calculate the color differences between the display devices for the number of acquired virtual color matching functions, and
   wherein the color matching function selection unit is configured to select a color matching function to be used to display images from the selection candidate color matching functions on the basis of the calculated color differences for the number of virtual color matching functions.

5. The image display system of claims 1, further comprising a storage unit storing the spectral data.

6. The image display system of claims 3, further comprising a storage unit storing the virtual color matching functions.

7. The image display system of claims 1, further comprising:
   a target color receiving unit; and
   a target color conversion unit,
   wherein the target color receiving unit is configured to receive target color values of a reference display of the display devices, and
   wherein the target color conversion unit is configured to convert the target color values into color values using the color matching function selected by the color matching function selection unit.

8. A method for causing a computer to function as an image display system for displaying images on display devices, the image display system including a plurality of display devices, the method comprising:
   a spectral data acquisition step;
   a candidate color matching function acquisition step;
   a color difference calculation step; and
   a color matching function selection unit,
   wherein the spectral data acquisition step comprises acquiring, by the computer, spectral data of the display devices, wherein,
   the candidate color matching function acquisition step comprises acquiring, by the computer, a plurality of selection candidate color matching functions that are candidate color matching functions that may be selected in the color matching function selection step,
   the color difference calculation step comprises calculating, by the computer, color differences between the display devices with respect to each of the selection candidate color matching functions using the spectral data, and
   the color matching function selection step comprises selecting, by the computer, a color matching function that reduces color differences in appearance for many observers, from the selection candidate color matching functions on the basis of the calculated color differences.

9. A non-transitory computer readable medium that stores a program for causing a computer to function the method of claim 8.

10. A display device for displaying images, comprising:
    a spectral data acquisition unit;
    a candidate color matching function acquisition unit;
    a color difference calculation unit; and
    a color matching function selection unit, wherein,
    the spectral data acquisition unit is configured to acquire spectral data of the display devices,
    the candidate color matching function acquisition unit is configured to acquire a plurality of selection candidate color matching functions that are candidate color matching functions that may be selected by the color matching function selection unit, the color difference calculation unit is configured to calculate color differences between the display devices with respect to each of the selection candidate color matching functions using the spectral data, and wherein the color matching function selection unit is configured to select a color matching function that reduces color differences in appearance for many observers, from the selection candidate color matching functions on the basis of the calculated color differences.

* * * * *